United States Patent

[11] 3,605,010

| | | |
|---|---|---|
| [72] | Inventor | Stanford G. Folus<br>Randallstown, Md. |
| [21] | Appl. No. | 841,474 |
| [22] | Filed | July 14, 1969 |
| [45] | Patented | Sept. 14, 1971 |
| [73] | Assignee | Becton, Dickinson and Company<br>East Rutherford, N.J. |

[54] AUTOMATIC LYSIS DETECTION APPARATUS
11 Claims, 4 Drawing Figs.

[52] U.S. Cl. ............................................. 324/30 R,
23/230 B, 23/253
[51] Int. Cl. ............................................. G01n 27/42
[50] Field of Search................................. 324/30, 62;
23/230, 253

[56] References Cited
UNITED STATES PATENTS

| | | | |
|---|---|---|---|
| 3,267,362 | 8/1966 | Page. ........................... | 324/30 |
| 3,267,363 | 8/1966 | Young........................... | 324/30 |
| 3,421,982 | 1/1969 | Schultz......................... | 324/30 UX |

Primary Examiner—Michael J. Lynch
Attorney—Kane, Dalsimer, Kane, Sullivan and Kurucz ABSTRACT: A portable compact lightweight apparatus for measuring the time for initiation of clot formation of blood or plasma by detecting the presence of fibrin, and for measuring the time required for the fibrin to lyse. The apparatus provides means for producing and detecting fibrin. Electrode means are associated with said apparatus for holding the fibrin thread. Furthermore, means are provided for producing a circuit and detecting the current flow while the fibrin is intact and shutoff means are present and responsive to the lysing of the fibrin which breaks the current path thereby recording the time for a fibrin to lyse.

PATENTED SEP 14 1971

INVENTOR
STANFORD G. FOLUS
BY
Kane, Dalsimer, Kane, Sullivan & Smith
ATTORNEYS

AUTOMATIC LYSIS DETECTION APPARATUS

CROSS-REFERENCE TO RELATED APPLICATIONS

Reference is made to U.S. Pat. No. 3,267,364 issued Aug. 16, 1966 to Page et al. for a coagulation timer, the disclosure of which is hereby incorporated by reference.

BACKGROUND OF THE INVENTION

The above-mentioned related application points out in considerable detail and clarity the process of blood clotting or coagulation which is basically the transformation of liquid, blood or plasma into a semisolid gel-like state of consistency. It is also pointed out in considerable detail the importance of being able to measure the length of time required for the blood to coagulate for certain laboratory analyses and tests. The apparatus as described in that invention and which is incorporated in the structure of this disclosure relates to the measurement of prothrombin time and coagulation properties of blood, for the purposes of determining the characteristics of the hemostatic mechanism. As for example, in anticoagulant therapy, it is also pointed out that the invention has wider applications to the field of liquid resistivity and conductivity determinations of the presence of certain bodies in liquids, and fibrillation per se. However, for illustrative purposes, the disclosure was directed and devoted primarily to hemostasis. In the present discussion, we will also direct the disclosure to the same process for clarity purposes.

Exactly how prothrombin time is determined and the importance of determining that time and exactly what it is is described in considerable detail in the related application and the same discussion is equally applicable to this device. The prior invention was directed toward an improved manner and apparatus for determining the end point of prothrombin time which before had presented somewhat of a problem and introduced a component of error which in most techniques was human. The significant improvement as defined by the apparatus and method for studying coagulation properties of blood is readily apparent from the above-mentioned patent.

This disclosure is directed toward an apparatus similar to that described in the patent but with additional improved apparatus and method for carrying the study of blood beyond the coagulation stage in an automatic manner. The apparatus of the patent has been developed so as to serve an additional function of automatically and objectively determining the length of time required for a fibrous clot to begin dissolution after it has been formed. Previously, the apparatus was utilized primarily in a laboratory or clinic devoted to testing and measuring coagulation properties of blood and plasma.

The machine of this disclosure expands the versatility and scope of the machine of the above-referenced patent application to provide a machine which is capable of producing an additional function. In addition to all of the functions which the machine of the cross referenced application can perform, the machine of this invention can automatically and objectively determine the length of time required for a fibrous clot to begin dissolution, and therefore can be used in coagulation study areas in which there are presently no known automated devices available Furthermore, the machine is adaptable to be used in many applications in enzyme studies and will also prove useful in clinical work, for example, infections which utilize kinases to break down cell walls and permit invasion by the organism. However, the function of the improved machinery to which this disclosure is particularly directed is that of measuring the time for clot lysis to occur. As previously noted, the coagulation timer of the above referenced patent measures the time for a clot to form. This application is designed to measure the time for a clot to form, the time it takes for the clot to be driven onto the stationary electrode by the action of the moving electrode and the time for clot lysis to occur after a fibrin thread has been pulled up by the moving electrode to complete the circuit. The discrete shape of the stationary electrode helps retain the clot and thereby maintain electrical contact with it. At that time, a fibrin thread is pulled up by the moving electrode completing the other side of the circuit. This connection will remain in effect until some biological function causes the fibrin thread to weaken and break. Loss of the fibrin thread is interpreted as clot lysis and it naturally would be particularly advantageous in the blood testing field to be able to provide an automatic machine with a digital counter which will operate to measure the time from when the clot is formed until clot lysis occurs as well as the clotting time as measured by the machine of the previously related patent. This would be extremely helpful in the art since as previously stated the determination of the length of time for clot lysis is often helpful in many testing procedures. Neither the mechanical electrode action nor the current passing through the fiber will of themselves cause the fiber to break. Therefore, by developing the previously known machine to include circuitry dependent upon the length of time during which the fiber is whole and which will include apparatus to insure that the fiber will be maintained during its normal biological life would be extremely helpful and advantageous in the art. It is to this end, that the invention of this disclosure is directed.

SUMMARY OF THE INVENTION

The apparatus disclosed herein includes a portable compact lightweight apparatus for measuring the time for initiation of clot formation of blood or plasma be detecting the presence of fibrin, and for measuring the time for a fibrin to break. The apparatus includes fibrin producing and detecting means. Electrode means are associated with said apparatus for holding the fibrin thread. Furthermore, means are provided for producing a current and detecting the current flow while the fibrin is intact and shutoff means are present and responsive to the lysing of the fibrin which breaks the current path thereby recording the time for a fibrin to lyse.

The primary objective of the invention is to provide a machine which will meet and accomplish the above mentioned functions. In short, it is directed toward a machine which in addition to measuring the length of time for blood to clot will automatically and objectively measure and determine the length of time required for a fibrous clot to begin dissolution. A further objective is to provide a machine which will contain an apparatus and circuitry arrangement which will associate with a formed fibrin thread to form an electrical circuit which will remain intact until the fibrin thread deteriorates sufficiently to cause the circuit to react in a manner which will record the lifetime of the fibrin thread.

Other objects and advantages will become apparent from the following detailed description, which is to be taken in conjunction with the accompanying drawings illustrating a somewhat preferred embodiment of the invention.

DESCRIPTION OF THE PREFERRED EMBODIMENT

Figure 1:
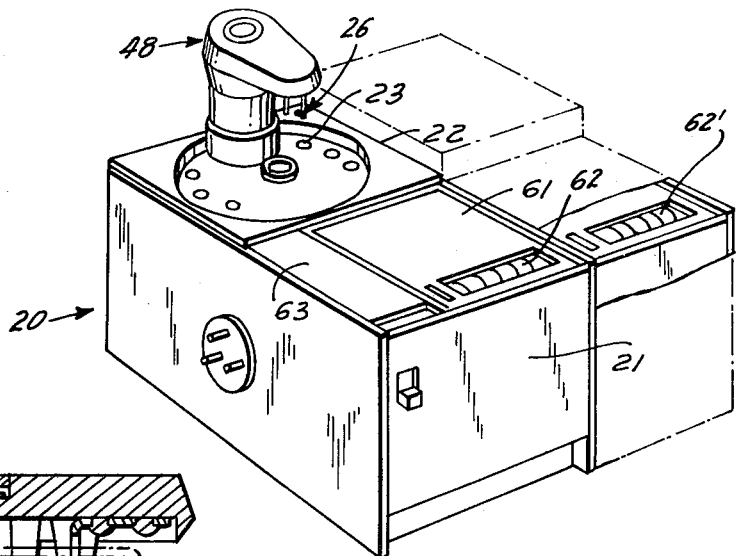
FIG. 1 is a perspective view of the invention with a suggested housing arrangement principally for the additional circuitry shown in phantom.
Figure 2:
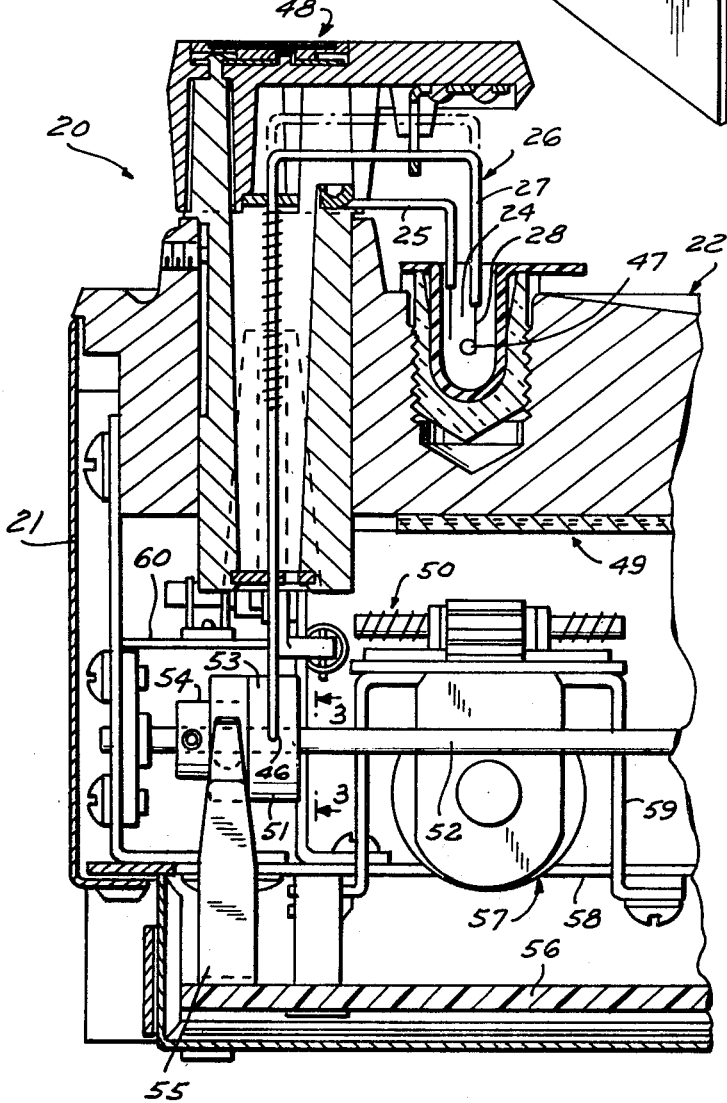
FIG. 2 is an enlarged sectional elevation view thereof with a portion of the apparatus broken away and removed.
Figure 3:
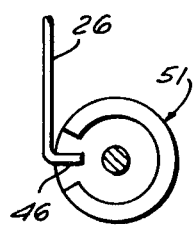
FIG. 3 is a side elevation view of the lower portion of the movable electrode of the apparatus of the invention and the cam which the electrode follows.
Figure 4:
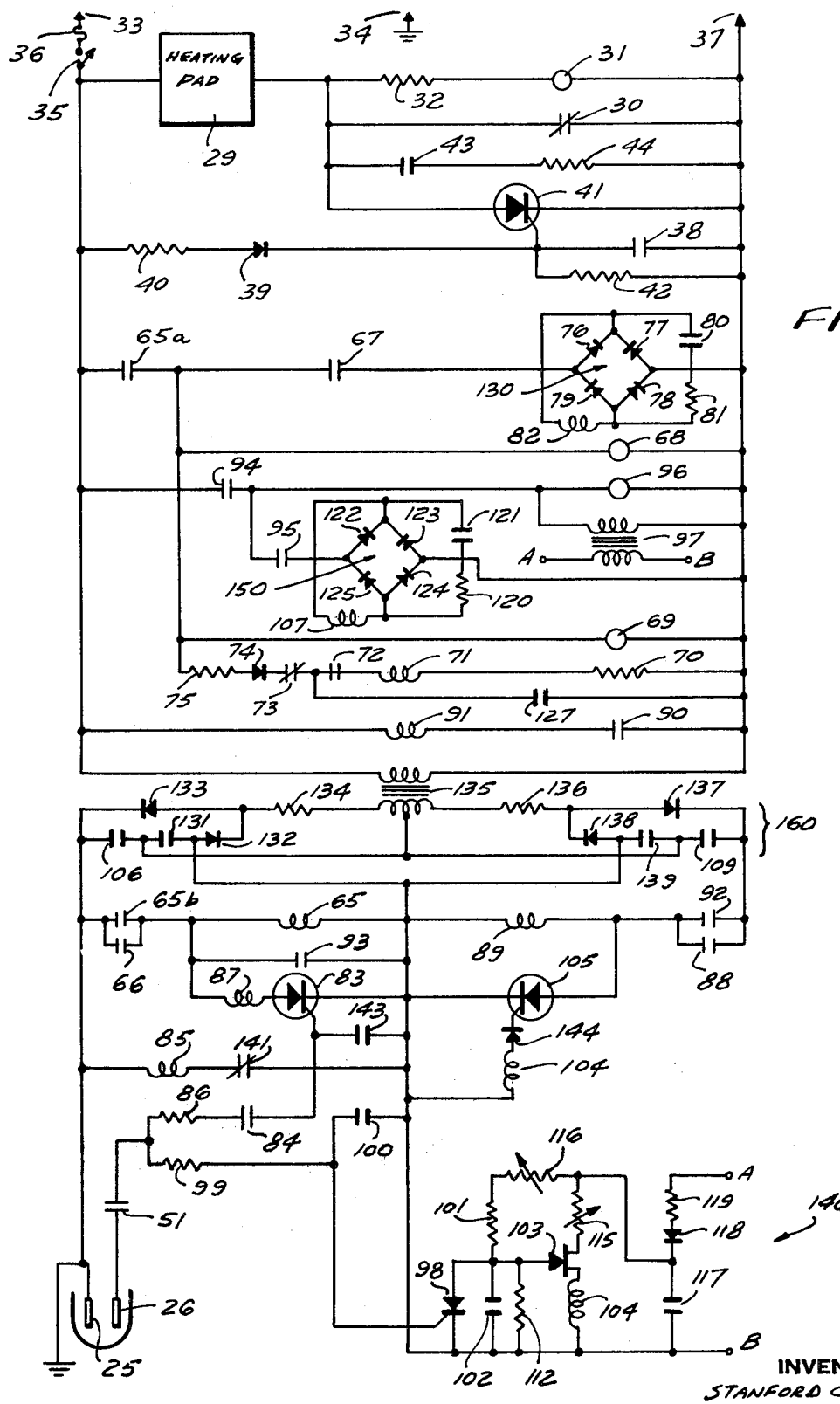
FIG. 4 is a diagrammatic view of the electrical circuitry employed.

Since the physical appearance of the machinery employed is somewhat the same as the machinery employed in the previously mentioned related patent, this machinery is depicted in the drawings without being shown in any great detail. In fact, a proposed overall configuration of the machine is shown in the drawings as being approximately the same as in the related patent with a suggested change in configuration being indicated in phantom in FIG. 1 to show one of a variety of types of housings which would be acceptable to contain principally the additional circuitry utilized in this invention. The several minor changes in small portions of the machine construction are shown in FIGS. 2 and 3 and will be discussed in the text of material. However, with the additional circuitry involved to accomplish the desired results, a detailed diagrammatic view of the since of the entire system employed with the machinery is shown in FIG. 4 of the drawing in order to particularly point out how the machinery has been adapted to accomplish much thermostat the goals of this invention. Also, since for exemplary purposes the material being tested by the machinery of the related application was blood, to be consistent, the same substance will be discussed in connection with the machinery and circuitry employed in this invention.

As previously stated, the basic structure of the machine remains the same. This naturally includes a coagulation timer 20 supported by a casing 21 along with the additional circuitry as part of the printed circuit board 56 to account for the time measurement of the clot lysis to occur. Once again, a heater block 22 serves to heat ingredients to be mixed and maintain them at the selected temperatures. The block is preferably of a heat conductive material as, for example, aluminum. The block includes a series of wells 23 for receiving test tubes which would in the case of time determinations contain each patient's plasma or control plasma or selected chemical reagents for carrying out the coagulation process. Centrally of the block is a reaction well 24 which is adjustable for purposes of determining the amount of immersion of the electrodes 25 and 26 as well as the degree of withdrawal of the movable electrode 26 from the liquid. The heating block 22 is of course fastened to the casing 21.

The heater system 49 serves to maintain the liquids mounted on the block at predetermined temperatures fluctuating within narrow limits and at the same time permit quick heat up of such liquids. For such purposes a binary heating system 49 is provided which obtains short warm up times and a stabilized temperature within a narrow range. The heater is mounted in a manner which will electrically isolate it from the base of the heating block upon which the heater is disposed. In the case of the time determinations with which we are concerned, the accepted standard operating temperature is that of normal body temperature which is taken to be 37 degrees Centigrade. The thermostats of the hater system are naturally adjusted to maintain the most desirable temperature and are suitably mounted with the structure housing the binary heating system.

The heating system may be of the type disclosed in patent issued to Bruce B. Young on July 21, 1964 as Pat. No. 3,141,948 for electrical apparatus. Suffice it to say at this time, that the heating elements and the thermostats are so placed with respect to their heating block 22 that they respectively directly influence and are influenced by the temperature of this block. In FIG. 4, there is shown a warmup circuit comprising: a heating pad 29 which includes an internal warmup resistance element, the bimetallic thermostat 30, having a suitably large differential between its turnoff and turn on temperatures, the neon light 31, the resistor 32 and the input terminals of a 115-volt source.

When the voltage from the voltage source is supplied to the warm up circuit by means of the activation of an appropriate switch 35 through fuse 36, current will flow through the resistance element in heating pad 29 and the closed contacts of the bimetal thermostat 30 which is in shunt with the series combination of the resistor 32 and the light 31. Since the thermostat 30 is effectively a short circuit across the neon light, the latter will be off when the switch is first turned on. When the resistance element in heating pad 29 heats up the body to the desired temperature, the thermostat 30 opens so that the current from the voltage source now flows through resistor 32 and light 31 turning on the latter. Current also flows through the heating element in the heating pad but since the resistance value of resistor 32 is relatively high and since as much as 70 volts are required to activate the light, the small amount of current passing through the coil in the heating pad does not produce much in the way of heat. At this time, the temperature maintenance circuit comprising silicon controlled rectifier 41, thermostat 38, resistors 40 and 42, and diode 39 is ready to operate. After the warm up period, the contacts of thermostat 30 remains open, since the temperature maintenance circuit described below holds the body at a temperature higher than the temperature at which the contacts of thermostat 30 will reclose. The light 31 stays on and thereby provides a visual signal that the body has arrived at the desired temperature.

Although the temperature maintenance circuit varies in the number and type of elements contained therein, it performs substantially the same function as the similar temperature maintenance circuit of the above referenced cross related patent. It includes a fine or vernier thermostat 38 which may, for example, be a mercury type. One terminal of thermostat 38 is connected to rectifier 39, resistor 40 and voltage source 33. This terminal of thermostat 38 is also connected to a silicon controlled rectifier 41. The other terminal is connected to terminal 37 to complete the circuit. Shunting thermostat 38 is resistor 42 which has a relatively high resistance. Resistor 40 generally also has a very high resistance. Current passes through the heating element contained in heating pad 29 from terminal 33 when switch 35 is closed into rectifier 41. Connected in parallel with rectifier 41 is a filter capacitor 43 and a resistor 44 of small resistance which serves as a filter to ensure the uniform AC current flow to rectifier 41 so that the circuit operates properly. Rectifier 39 is principally located in the circuit to ensure that a positive voltage is directed to the gate of rectifier 41 at all times.

When the temperature of the body exceeds the predetermined temperature, the mercury rises in the thermostat 38 which, as readily apparent from the circuit diagram, will cause no current to pass through the heating coil of heating pad 29. This is based primarily on the control of thermostat 38 over rectifier 41. No current will flow since thermostat 38 effectively shunts the gate of the rectifier 41.

When the temperature of the body decreases, the mercury in thermostat 38 falls, removing the shunt allowing the positive potential to appear at the gate of rectifier 41. Rectifier 41 will then again react and current will pass through the heating element in heating pad 29. It is readily apparent that although the circuitry is somewhat simplified from that of the heating circuit as presented in the previously mentioned related application, the function and operation is similar so that substantially the same results are obtained.

As in the related application, the electrodes 25 and 26 during the operation of the timer are supplied with an electrical potential when movable electrode 26 is raised above the surface of the liquid in the reaction well. When fibrillation or more particularly, thrombosis occurs, the fibrin will be sensed and lifted out of the blood specimen by the movable probe. At such time, a current path is provided between the electrodes 25 and 26 thereby determining the end point of that particular test. Stationary electrode 25 is similar in shape and construction to that of the above mentioned application. Similarly, the movable electrode 26 may have a similar construction which includes a wire tip 28 extending from a tube 27. The free end of the wire of the movable electrode 26 is bent at a predetermined spaced distance from the end to provide a transversely extending lifting arm. This arm senses and lifts the fibrin network from the blood sample in the contemplated prothrombin determinations. The tube includes a double 90° bend whereby an elongated arm is formed which terminates in a cam follower tip 46, the purpose of which will become apparent shortly. For the portion of this test during which we test the life span of the particular fibrin held up by moving electrode 26 and forming the particular closed electrical circuit between the movable and stationary electrode, it has been found most advantageous to modify moving electrode 26 to provide a better plasma or fibrin holding mechanism. This is facilitated by forming a loop 47 of stainless steel wire with an approximate inner diameter of 0.062 inch and an outer diameter of 0.125 inch. Shaping of stationary electrode 25 is not an absolute requirement but should be held open as an optional design parameter. In general, the probe is similar to the probe used in the cross-referenced related application with the major difference lying in the immediately above-mentioned subject matter concerning the electrodes.

Electrically, the stationary probe 25 is earthed or connected to ground whereas movable electrode 26 is coupled directly to the conductivity detection circuitry in a manner to be described. The stroke of movable electrode 26 will be discussed at this time because of its relative importance. First of all, it should be established and be made clear that the space between electrodes is not critical.

The dimensional parameters of the wire and projecting arm are not necessarily critical, the surface area of the wire further being of little consequence. The movable probe 26 completes one cycle per second, a cycle being one complete sweep into, out of and then back again into the blood specimen.

The probe carrier assembly 48 serves to properly place the electrodes in the reaction well 24 when the timer is set in operation. Assembly 48 is substantially the same as that of the above referenced related patent. When in nonuse or prior to initiation of operation or after an end point has been reached, the probe carrier assumes a rest position at which the electrodes 25 and 26 are directed upward and remain a fixed distance directly over the reaction well. All of the elements of probe carrier assembly 48 in the manner in which it is attached to the entire structure of the invention are the same as in the related patent.

Furthermore, an electrode carrier release mechanism 50 once Second, is present and serves a dual purpose. First, while in a deenergized state, it is adapted to maintain the electrode carrier in its rest position. Second, in an energized state, it will permit the electrode carrier to descend. In this manner the electrodes 25 and 26 will be placed within reaction well 24. Furthermore, as in the related patent, in order to enable the attendant or timer operator to remove instruments, fingers and the like from the path of travel of the electrode carrier and electrodes, a time delay is incorporated into the carrier release mechanism before the probes are permitted to descend.

Structurally, this electrode carrier release mechanism 50 once again is similar to that as described in the previously mentioned related patent.

Similarly, the movement of movable probe 26 as well as pulsing of the timing means together with the application of electrical potential means across the electrodes only when movable electrode 26 is raised above the surface of the blood sample, is influenced by a drive mechanism (not shown). The same structure as employed in the related patent may one again be utilized. However, there is a difference in the structure of the cam member 51 anchored to the output shaft 52 and rotatable therewith. This member once again includes a cam contact portion 53 and a cam insulating portion 54. However for purposes which will become readily apparent further in this disclosure, the cam assembly 51 is modified in this invention to provide a greater contact surface area. Therefore, when a clot is detected, the electrode 26 will remain in the up position an in contact with the detection circuit. This factor is particularly useful in the proper operation of this device. As in the related patent, a contact arm 55 extends from the printed circuit board 56 and wipes across the electrical contact portion 53 of the cam member 51. As in the patent, the movable probe 26 will be lifted through its sweep in ascending path upon contact with portion of the cam member 51 and then passed through its descending sweep into the specimen when not in contact with the electrical contact portion 53 of the cam member.

A time delay relay 57 is supported on the plate 58 by means of a suitable bracket 59. Relay 57 serves to provide a suitable time delay before the solenoid 60 is energized to permit the release of the electrode carrier 48. In this connection, the clinician or attendant will have ample time to remove any instruments or members of the body from the path of travel of the probe carrier assembly 48 particularly the probes. A similar type of suitable time delay relay as mentioned in the above related patent will once again be suitable for this device.

The present invention utilizes two drive motors (not shown). This is in accord once again with the above related patent and operation and connective parts of the assembly as disclosed in that patent are readily applicable to the device as presented herein. That is, the single motor having two drive takeoffs of that patent is readily interchangeable with the two separate motors utilized here. The timing mechanism (not shown) as described in that patent is employed herein and includes a timing means having a resetable digital readout which may be obtained commercially as Veeder Root Counter from Veeder Root, Inc. The readout 62 as stated will indicate time in tenths of a second. Two such timing mechanisms are utilized in this apparatus with the second timer readout 62' being shown in the drawings. The purpose of having two timing mechanisms and the operation of each is discussed below.

The timer bar assembly 63 which is employed in the above discussed related patent is also employed in this device. The assembly is employed for purposes of initiating the operation of the motor drive mechanism (not shown) which actuates the timer (not shown) and the movement of the probes after the preset time interval created by the probe carrier release mechanism 50 expired at which time the probe carrier assembly 48 is lowered. The structure and operable steps of this assembly are relatively the same as those discussed in connection with the above related patent.

Therefore, it is readily apparent from the above discussion that substantially the same mechanical structure is employed to accomplish the objects of this invention as that employed to accomplish the objects of the cross referenced related patent. Since the features of that structure have been discussed in considerable detail in the patent which is readily available, we have not included a detailed description or drawings of these features in this application. The particular objects of this disclosure are met and achieved by the additional circuitry innovations incorporated into the existing circuit characteristics as well as the minor changes in cam structure and movable probe structure as previously discussed.

In the circuit diagram of the drawings, the new circuit arrangement is shown in detail in FIG. 4. We have previously in this disclosure already discussed the heating circuit which is substantially the same as that of the cross referenced related application as will be readily apparent in the following description.

As previously mentioned, the probe drop and heating circuits are relatively the same as those used in the above referenced related patent. In regard to the counting circuits employed, the basic structure of these circuits which will be described somewhat in detail hereafter and their associated components are similar to those in the related patent with the substantial difference being in that two complete and separate counting systems are used in this device. One is used to record clotting time and the other to record lysis time.

To summarize the detection system of this device, the system utilizes a silicon controlled rectifier to bypass the current around the controlled relay so that the relay deenergizes. The relay was energized at the start of the test by the timer bar of the automatic pipette. When an end point such as a clot is detected, the circuit is so arranged so that the clot time counter is stopped and the lysis time counter is started. A paralyzing network utilizing a unijunction circuit with an input shunt transistor allows the lysis time counter to run as long as the fibrin thread is intact. When the fibrin thread breaks, the paralysis is removed allowing the unijunction to go to its peak point which fires another silicon controlled rectifier to open a control relay.

Turning to the drawing, the leads 33 and 34 extend to the selected electrical energy source as previously mentioned and may be suitably fused as shown in 36 with lead 34 being the ground wire. When a test is to be run, the coil of the relay 65 is energized either by pressing the timer bar or employing a switch at 66. This action closes the contacts 65a supplying voltage to the bridge circuit 130 through the reed switch 67. It may also be noted that the contacts 65b in shunt with switch 66 are also closed at the same time. Voltage is also supplied to the counter drive motor 68 and the time delay relay circuit which includes relay 69, resistor 70, solenoid 71, normally open contacts 72, normally closed contacts 73, rectifier 74, resistor 75, and capacitor 127.

Bridge circuit 130 which forms a large portion of the first counting circuit is comprised of the following elements, as shown. Rectifier 76, 77, 78 and 79 connected to capacitor 80, resistor 81 and counter coil 82 in the manner as shown.

The counting circuit including bridge circuit 130 and the counting motor and the time delay relay as above described are substantially the same in operation and function as in the above related patent.

When a clot is detected by the probe electrode, a positive voltage is applied to the gate of the silicon-controlled rectifier 83 through the closed contacts 84 of coil 85, the one meg. resistor 86 and the cam 51. This positive voltage causes the rectifier 83 to conduct, allowing current to energize relay 87. The contacts 88 of relay 87 then close causing the coil of relay 89 to be energized. The contacts 90 of relay 89 then close allowing the coil of relay 91 to become energized.

The contacts 92 of relay 91 close at the same time locking the coil 89 in the energized condition. Also at this time, contacts 93 of relay 91 close shunting the current from relay coil 65. Relay 65 deenergizes which opens the 65b locking contacts and the 65a contacts. This deenergizes coil 87 and its contacts 88 also open. Contacts 94 also close the second counting circuit through reed switch 95. The counter motor 96 and the transformer 97 are also activated. The unit has now switched automatically from the clot detection mode to the lysis detection mode.

The unit in this state by the paralyzing circuit 140. Since the counter motor 68 which also drives the probe electrodes has stopped, the moving electrode 26 is now in the up position maintaining the positive voltage on the cam 51 through the retained clot. This positive voltage is applied to the gate of the silicon controlled rectifier 98 of paralyzing circuit 140. The resistor 99 limits the current to the gate to avoid deleterious effects on the clot through electrolysis. A capacitor 100 is connected at this point to avoid premature triggering of the rectifier 98 from transient voltages. Conduction of rectifier 98 since its anode is connected to the emitter of the unijunction circuit, as shown, prevents the unijunction from rising to the peak point or firing level. When the clot or fibrin thread held by the electrode breaks, the positive voltage which was imposed on the gate of rectifier 98 drops to zero. Rectifier 98 ceases to conduct allowing the emitter to rise to 15 volts at a rate determined by the RC circuit composed resistor 101 and capacitor 102. When peak point is reached, the unijunction 103 conducts allowing a current pulse to flow through the transformer 104. The secondary of this transformer is connected to the gate of rectifier 105, then drives rectifier 105 to conduction. The conduction of rectifier 105 shunts the current flowing through the relay 89 and causes the relay to deenergize The contacts 90 open deenergizing relay 91. The contacts 94 open deenergizing the counting circuit thereby giving lysis time on the counter 107 which is part of bridge circuit 150. The contacts 92 open interrupting the current through rectifier 105 which causes rectifier 105 to turnoff. The unit is now automatically back in the clot detection mode ready for the next test.

It should be additionally noted that the transformer 97 supplies operating voltage to the paralyzing circuit 140. Also, there is a voltage doubling circuit to provide operating voltage for the detection circuit located on the lines indicated by the numeral 160. The relay 85 is provided to open he current path to rectifier 83 thus reducing the current through the clot.

Paralyzing circuit 140 as shown is basically comprised of rectifier 98, resistor 101, capacitor 102, resistor 112, transistor 103, the primary of transformer 104, variable resistor 115, variable resistor 116, capacitor 117, rectifier 118 and resistor 119 with this unit of elements being connected to the secondary of transformer 97 as illustrated by contact points A and B.

Bridge circuit 150 which incorporates counter 107 also includes resistor 120, capacitor 121, reed switch 95 and rectifiers 122 through 125 as illustrated. Turning to the circuitry of time delay relay 69, a capacitor 127 is connected to the common of contacts 72 and 73 to provide the current pulse needed to energize solenoid 71 through resistor 70.

As depicted, the elements incorporated in detector circuit 160 are capacitor 106, capacitor 131, rectifier 132, rectifier 133, resistor 134, the secondary of transformer 135, resistor 136, rectifier 137, rectifier 138, capacitor 139 and capacitor 109. The electrodes, stationary electrode 25 and movable electrode 26 are shown connected in their appropriate positions. A additional set of contacts 141 is shown in line with coil 85 and stationary electrode 25 and is part of the basic circuitry as well as capacitor 143 shunt connected to a rectifier 83. It should be additionally noted that a rectifier 144 is connected in line between rectifier 105 and the secondary of transformer 104 for readily apparent circuitry purposes.

In view of the foregoing, the aforenoted objects and advantages are effectively attained. Although a single preferred embodiment of the invention has been disclosed herein, it should be understood that the invention is in no sense limited thereby, but is to be determined by the scope of the appended claims.

1. A portable compact and lightweight apparatus for measuring the time for initiation of clot formation of blood by detecting the presence of fibrin and for measuring the time for a fibrin to lyse including fibrin producing and detecting means, electrode means associated with said apparatus for holding the fibrin thread, and means for producing an electric circuit which includes said electrode means and a current path and detecting the current flow in said electric circuit while the fibrin is intact wherein the improvement comprises:
  means connected to said electric circuit and responsive to he initiation and termination of current flow through the circuit for measuring the time for a fibrin to lyse; and
  shutoff means connected to said electric circuit and responsive to the lysing of the fibrin which breaks the current path thereby recording the time for a fibrin to lyse.

2. The invention in accordance with claim 1 wherein said fibrin producing and detecting means includes a casing of reduced size, a blood specimen receiving means on said casing for receiving a specimen of blood to be measured, said means for producing a circuit and detecting the current flow including conductivity means for cooperating with fibrin to produce an electrical current path, said conductivity means including said electrode means which contains an electrode adapted to be stationary for contact with the specimen and another electrode adapted to be movable into and out of the specimen, a mechanism for moving the electrode into and out of the specimen, timing means for registering the time to detect the presence of fibrin in said specimen, electrical potential means for supplying an electrical potential to said conductivity means, and switch means for initiating the operation of said timing means.

3. The invention in accordance with claim 2 wherein said means for measuring includes a second timing means provided to measure the time for the fibrin strand to lyse, cutoff means connected to said circuit and being provided for stopping the movement of the movable electrode upon lifting of a fibrin out of the specimen by the movable electrode and passage of current through said conductivity means, and paralyzing means are associated with said second timing means to permit said second means to run as long as a fibrin is intact and to cooperate with said shutoff means to facilitate the stopping of said second timing means when said fibrin lyses.

4. The invention in accordance with claim 3 wherein said measuring means includes; the first timing means for registering the time to detect the presence of fibrin in said specimen, the second timing means, means for stopping said first timing means and starting the second timing means to measure the time for the fibrin strand to lyse, said cutoff means stopping the operation of said first timing means; a second switch means associated with said cutoff means and said second timing means so that when said first timer is stopped said second timer is started, and said paralyzing means is associated with said second timer to permit said second timer to run as long as the fibrin is intact and to cooperate with said shutoff means to facilitate the stopping of the second timer when the fibrin lyses.

5. The invention in accordance with claim 2 wherein said apparatus includes a second mechanism for lowering both of said electrodes into said receiving means and out of said receiving means.

6. The invention in accordance with claim 5 wherein said second mechanism includes a carrier supporting both of said electrodes, part of said carrier projecting outwardly from the casing and part of said carrier projecting inwardly of said casing and said carrier being displaceable relatively thereto from an electrode immersed position to an electrode elevated position, latching means for releasably holding the carrier in the electrode elevated position, said carrier and said casing having interengaging surfaces for cooperating and directing said electrodes into the receiving means when in the electrode immersed position and away therefrom when in the electrode elevated position.

7. The invention in accordance with claim 5 wherein said apparatus includes time delay means for causing after a predetermined period of time following activation of said switch means, the latching means to release the carrier from the electrode elevated position whereupon the interengaging surfaces cooperate and direct the electrodes into the receiving means and the electrode immersed position and the first mechanism to move the movable electrode into and out of the liquid.

8. The invention in accordance with claim 2 wherein said fibrin producing and detecting means includes heating means for maintaining said specimen at a predetermined temperature, said heating means being binary and comprising a first thermostatically controlled heating means for heating said specimen quickly and adapted to become inoperative at a temperature above normal body temperature, and a thermostatically controlled second heating means for heating said specimen and maintaining it with a preset tolerance of substantially 37° Centigrade.

9. The invention in accordance with claim 2 wherein said mechanism includes a drive means including a motor having an output shaft, a cam rotatably mounted on said output shaft, said cam having stepped cam faces, said movable electrode adapted to engage the stepped surfaces of said cam whereby upon rotation of said cam by said motor through the output shaft the stepped surfaces of said cam move said electrode, said cam having a surface area sufficient to maintain said moving electrode in a predetermined position in contact with the detection means of the apparatus.

10. The invention in accordance with claim 2 wherein said movable electrode contains a loop on the end thereof in contact with the blood to facilitate the holding of the fibrin thereon.

11. A method of measuring the time for initiation for fibrilization of blood by detecting the presence of fibrin therein and for measuring the time for a fibrin to lyse by use of apparatus including fibrin producing and detecting means which includes electrode means, circuit production means, means for detecting the current while the fibrin is intact and shutoff means responsive to the lysing of the fibrin which breaks the current path comprising:
   forming a fibrin between said electrode means:
   completing a circuit with the fibrin forming part of the circuit so that the current will flow when the fibrin is intact;
   activating said shutoff means when said fibrin lyses and the circuit is broken;
   detecting the length of time current flowed through the circuit; and
   measuring the interval of current flow thereby measuring the time for a fibrin to lyse.